March 8, 1955   E. H. GETZ   2,703,452
DENTAL TRAY

Filed Dec. 26, 1951   2 Sheets-Sheet 1

INVENTOR.
EDWIN H. GETZ
BY
ATTORNEYS

March 8, 1955 — E. H. GETZ — 2,703,452
DENTAL TRAY
Filed Dec. 26, 1951 — 2 Sheets-Sheet 2
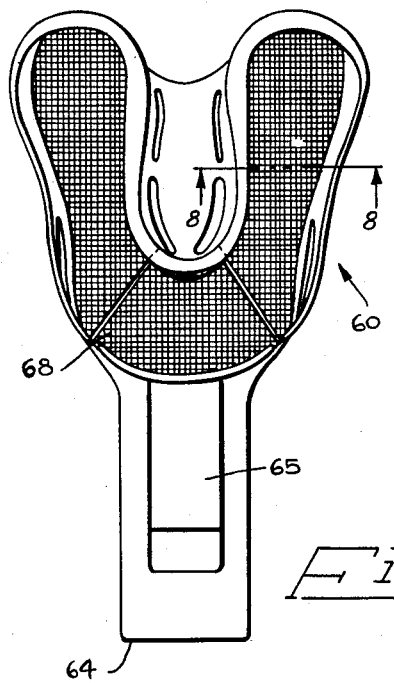
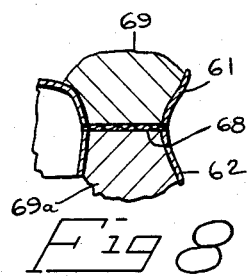
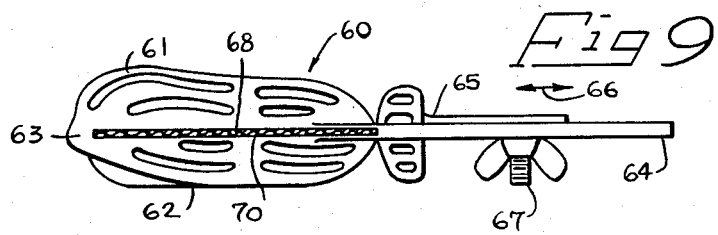
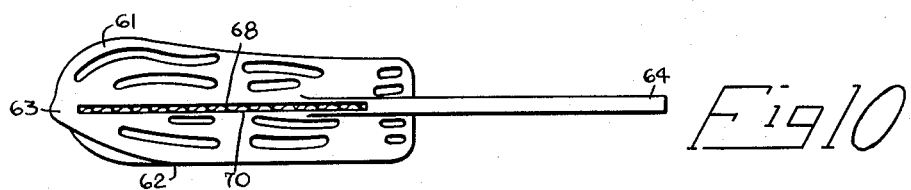
INVENTOR.
EDWIN H. GETZ
BY
Dicke + Padlon
ATTORNEYS

United States Patent Office 2,703,452
Patented Mar. 8, 1955

2,703,452

DENTAL TRAY

Edwin H. Getz, New York, N. Y.

Application December 26, 1951, Serial No. 263,148

11 Claims. (Cl. 32—19)

This invention relates to an improved dental tray and more particularly to an adjustable dental impression tray for obtaining the bite or true relationship in closure of the opposing teeth of each entire dental arch simultaneously, and at the same time that an impression is obtained of the preparations for inlay, crown or bridge or any combination of these restorations. The present application is a continuation in part of my copending application Serial No. 97,591, filed June 7, 1949, now issued as U. S. Patent No. 2,583,170, dated January 22, 1952.

It is an object of the present invention to provide an easily manipulated unitary dental impression tray having complementary sections adapted to retain a foraminous or reticulated layer between the complementary sections and impression material to permit the taking of impressions of teeth in both dental arches simultaneously preparatory to their restoration.

Another object of the present invention is to provide a dental tray of relatively simple, economical construction which can be readily and easily handled and used in connection with dental restorations for mouths of different sizes.

One other object of the present invention is to provide a dental tray for taking impressions of the full upper and lower dental arch simultaneously or any part thereof wherein the upper and lower labial and buccal sides thereof and the mid mouth body section are adjustable.

Still another object of the present invention is to provide a coolable dental impression tray having relatively shiftable but connected sections, each provided with perforated retaining walls adjacent each side of the dental arches of the mouth and adapted to readily retain the impression material thereon when used in the mouth.

Still another object of the present invention is to provide a manually operable tray for taking dental impressions adapted to retain an impression material and to cool the same thereon, while dental impressions are being taken.

A more specific object of the present invention is to provide an integral impression tray having upper and lower complementary sections each having perforated retaining walls for holding thereon an impression material, a handle for each section, a connecting bar between the walls of each section, reticulated means retainable by the sections, and water conducting means in the sections for cooling the impression material.

Other objects and features of the present invention will become apparent from the hereinafter detailed description taken in connection with the accompanying drawings, in which:

Fig. 7 is a plan view of a modification of the embodiment shown in Fig. 1;

Fig. 8 is a cross sectional view taken on line 8—8 of Fig. 7;

Fig. 9 is a side view of the embodiment shown in Fig. 7; and

Fig. 10 is a side view of another preferred embodiment of the invention, showing a complete unit without any locking members thereon.

Figure 1:
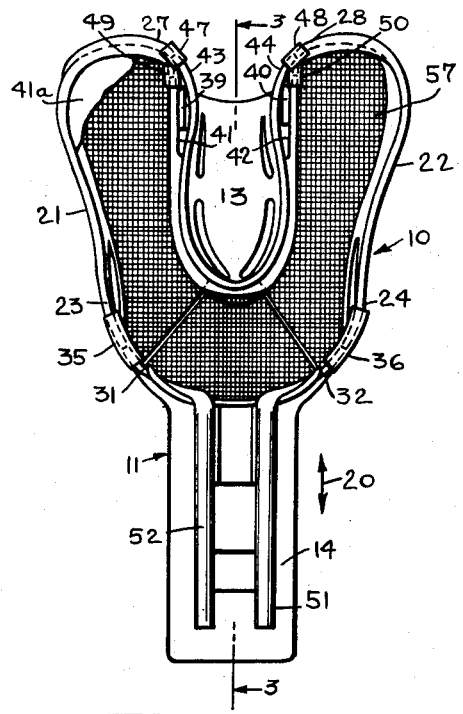
Fig. 1 is a plan view of a preferred embodiment of the invention.

Referring now to the drawings, there is provided a tray 10 comprising a frame member 11, a sectional member 12, and a mid mouth body member 13. Said frame as seen in Figs. 1 to 4 inclusive is provided with a handle portion 14 having a recess 15 and a slot 16. It will be noted that section member 12 has a section 17 and a stud 18 that mate with recess 15 and slot 16 in frame handle 14 respectively. Thus by adjustment of wing nut 19 sectional member 12 may be moved in the direction of the arrow 20 to suit various mouth shapes.

Frame 11 has side walls 21 and 22 which in turn have conduit ends 23 and 24 respectively and 25 and 26 respectively at the front end 27 and 28 and 29 and 30 at the rear. Front conduit ends 23, 24, 25 and 26 mate with conduit ends 31, 32, 33 and 34 respectively and are attached by flexible tubes 35, 36, 37 and 38 respectively. Said tubes 35, 36, 37 and 38 are long enough to allow for the adjustment of sectional member 12.

At the rear of frame 11 are extensions 39 and 40 which fit inside mid mouth member 13 and hold tightly against its side walls 41 and 42 respectively. Also at this area, conduit ends 27, 28, 29 and 30 are connected to conduit ends 43, 44, 45 and 46 respectively of member 13 by flexible tubing 47, 48, 49 and 50.

When frame 11, sectional member 12, and mid mouth member 13 are connected, the following is the path of the coolant. Coolant such as water enters at pipe 51 in sectional member 12 through joint 36 along upper part of wall 22 in the frame 11 to joint 48 in rear, then along upper wall 42 of mid mouth member 13 around upper wall 41 to joint 47 into frame 11 and along lower wall 21 to joint 37 through lower portion of sectional piece 12 and to joint 38, then along lower wall 22 of frame 11 to joint 50 then around bottom of mid mouth section 13 to joint 49 and from joint 49 the coolant flows to upper wall 21 of frame 11 through joint 35 into upper part of sectional member 12 and out through pipe 52.

Figures 2, 3:
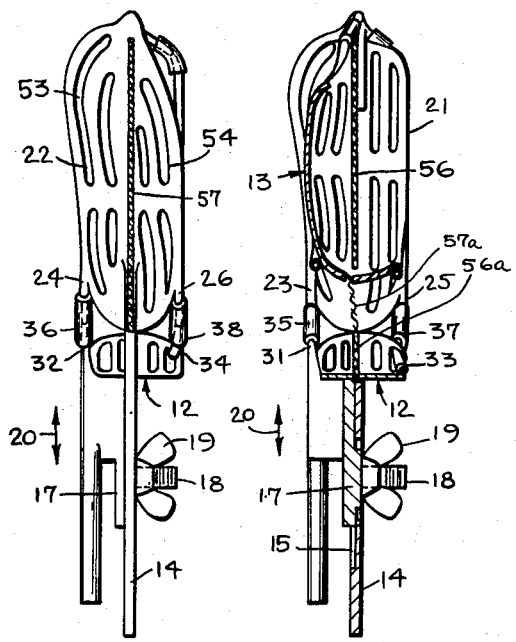
Fig. 2 is a side view of Fig. 1.
Fig. 3 is sectional view taken on line 3—3 of Fig. 1.
Figure 4:
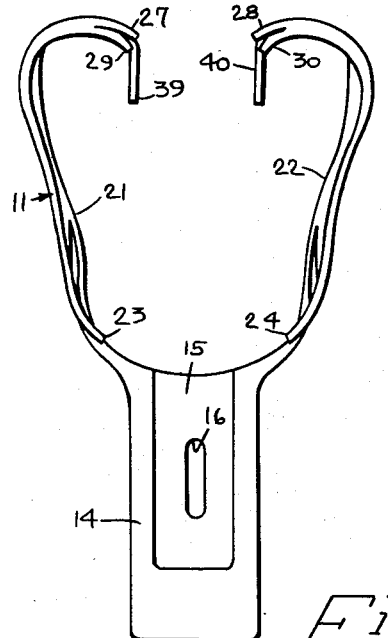
Fig. 4 is a plan view of one of the elements of the embodiments shown in Fig. 1.
Figures 5, 6:
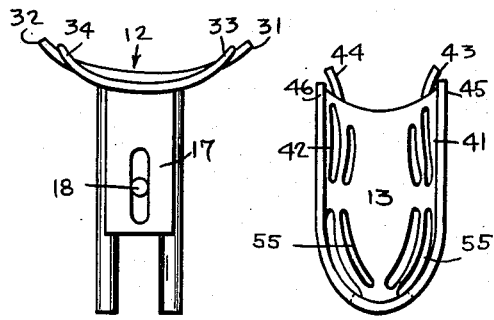
Fig. 5 is a bottom plan view of a portion of the embodiment shown in Fig. 1.
Fig. 6 is a bottom plan view of an element attachable to the element in Fig. 1.

It will be noted that said slidable member 12 and mid-mouth member 13 when joined to the frame 11, as shown in Figs. 1 to 3 inclusive, form a compact unit wherein impressions can be made of the teeth of the upper and lower arch simultaneously.

The walls 21 and 22 of said frame 11 are provided with a number of openings 53 and 54 in the upper and lower sections thereof, respectively, while the mid-mouth portion 13 is also provided with openings 55. The purpose of said openings in said walls and body portion is to retain the impression material when used in conjunction with the device herein disclosed.

Dividing said body section 13 and walls 21 and 22 in the central horizontal plane thereof as in Figs. 2 and 3, there is provided a space or slot 56 for accommodating and fixing therein a foraminous or reticulated material or gauze 57 which separates the impressionable material 41a to be used for taking impressions of any of the teeth of either the upper or lower dental arch. Such material may be of the type commonly used in dentistry and are usually hydrophyllic colloids.

A piece 57a of reticulated material is provided in a slot 56a in anterior member 13 opposite slot 56a in member 12.

It will be noted that the tray as hereinabove described is provided with water conducting means and the parts thereof are relatively adjustable while at the same time remaining as a complete unit during use.

In the modification shown in Figs. 7, 8 and 9 of the drawings, it will be noted that I provide a tray without the water cooling conduits therein, which tray is of substantially similar construction as that shown in Figs. 1 to 6 inclusive. In said modification it will be noted that the tray 60 is of unitary construction and that the upper section 61 is joined to the lower section 62 at junction 63 but that at the other end the lower section is provided with the handle 64 which may be set by extending member 65 which is adjustable in the direction of arrow 66 as shown in Fig. 9 and held together by said fastening means 67. Gauze 68 is inserted through slot 70 and the tray is ready for operation.

Fig. 8 shows a partial section with impression taking material 69 and 69a in place for an upper and lower simultaneous impression.

According to my invention I may also provide a one piece non-adjustable tray designed in the dental art for use in small, medium and large size mouths. Such type of embodiment is shown in Fig. 10.

From the foregoing description, taken in conjunction with the accompanying drawings, it will be noted that I provide a dental tray having relatively adjustable but fixed features for the labial or buccal walls of the tray. Furthermore, the tray as described and shown is directed to a full dental arch wherein any part of the tray can be used for taking the necessary simultaneous impression once the impression material has been placed against the gauze material 57. The mid mouth or body section 13, as shown and described, is integral with the rest of the device but also may be readily adjusted so that the tray as a whole can be readily adapted to accommodate various sizes and forms of mouths such as those having a low, medium or high vault or palate. The conduits, as shown in the tray of the preferred embodiment, are utilized for the purpose of conducting the cooling medium such as water, through the tray walls so as to effectively and quickly set the impression material and permit the formation of a definite and accurate impression from which inlays, crowns or various other types of dentures and bridges are made. The type of tray disclosed herein is preferably made of metal or other suitable material that may facilitate the cooling of the impression material when placed in the tray on either side of the gauze.

While preferred embodiments of my invention have been shown and described, it is to be understood that modification as to arrangement and use of parts and materials may be made without departing from the spirit and scope of the invention as claimed.

What is claimed is:

1. A dental impression tray comprising a frame conforming with the contour of both of the dental arches of the mouth, a handle extending therefrom, perforated upper and lower walls divergently extending from the central horizontal plane of said frame, a relatively adjustable mid-mouth section on said frame connectible therewith, said section conforming with the lingual and palate portion of the mouth, and a conduit following the outline of the walls of the frame and mouth section for cooling the same when a cooling medium flows therethrough, said frame having a transverse horizontal slot between the upper and lower walls for accommodating a gauze therein as a base for a hydrocolloid impressionable material.

2. A dental impression tray comprising a frame, an extending handle thereon, upper and lower opposed walls divergently extending from the central horizontal plane respectively of said frame forming a recess in the upper and lower walls for accommodating a mass of hydrocolloid material therein for taking impressions of either dental arch, a mid-mouth body member attachable to the frame between the walls, a relatively adjustable sectional member on said frame connectible therewith and in adjustable relation with said handle, an impression mass retaining reticule disposed in the central horizontal plane between said walls, and a conduit following the outline of the upper and lower walls of the frame and the top and bottom of the body member for cooling the impression mass between said walls when a cooling medium flows therethrough.

3. A water cooled dental impression tray comprising a frame following the contour of the dental arches of the mouth, a handle extending therefrom, spaced upper and lower opposed perforated sets of walls divergently extending upwardly and downwardly respectively from the central horizontal plane of said frame, a body member attachable to the frame intermediate one of the sets of the walls, and a conduit following the outline of the walls of the adjustable section, frame, and body member for cooling the same when a cooling medium flows therethrough.

4. A dental impression tray comprising a frame with a contour conforming with the upper and lower dental arch of the mouth, a handle extending from the frame member, a pair of inwardly extending members on said frame, a body member attachable to the inwardly extending members of the frame forming with the frame an upper and lower groove for accommodating the upper and lower dental arch, a reticulated member intermediate the upper and lower groove thereof, adjustable means connectible with the frame adapted to hold the frame and the body member together, and conduit means extending along the upper and lower portion of the frame to the body member and adjustable means for cooling any impression material held on the upper and lower part of the reticulated member.

5. A dental impression tray comprising a frame having upper and lower perforated walls adapted to fit around the upper and lower dental arch of the mouth, a handle extending therefrom, said walls extending from the handle and following the contour of the dental arch and extending around the end of the dental arch and to the other side of the arch, and having a perforated wall extending on the frame alongside of the arch on either side thereof, a reticulated member intermediate the upper and lower walls thereof, a mid-mouth member connected to the frame forming an inner perforated wall on said frame, means on the handle adapted to hold the frame and mid-mouth member together, and water conducting means on said walls for cooling any impressionable material held between said walls.

6. A dental impression tray comprising a frame whose outline is adapted to fit around the outer and inner part of the upper and lower dental arch of the mouth, a handle extending therefrom, an upper and lower perforated wall extending from the frame following the contour of the outer and inner part of such dental arch and extending around the end of the arch, a perforated body member connectible to said frame forming a perforated upper inner wall conforming with the inner dental arch of the mouth, a reticulated member intermediate the upper and lower walls thereof for retaining impressionable material thereon between said walls, means on the handle adapted to hold the frame and body member together, and water conduit means on the edge of said walls to cool impressionable material.

7. A dental impression tray comprising a frame adapted to simultaneously accommodate the upper and lower dental arch of the mouth, a handle extending therefrom, said frame having a perforated upper and lower buccal retaining wall, a distal connecting member extending from said frame, a mid mouth lingual buccal perforated section in connection with the connecting member, said mid mouth section having a perforated upper and lower lingual retaining wall, means on the frame to retain a reticule member intermediate the upper and lower walls in a horizontal plane thereof, adjustable means for the frame adapted to retain the frame and section together, and continuous water conducting and return cooling means extending from the handle, along the upper and lower walls, and through each section.

8. A dental impression tray comprising a unitary section adapted to be placed between the upper and lower arch of the mouth, said section having walls on each side of each arch and flaring outwardly of each arch, said section having said upper and lower walls perforated for retaining a hydrocolloid gum therebetween, the upper and lower inner walls thereof being disposed on the side against the interior of the arch and the upper and lower outer walls thereof being on the outside of the arch, spaced retaining means on the section for a reticulated member placed intermediate the walls and between the retaining walls, a handle extending from the first named means, fastening means on the section adapted to retain the section together, a mid-mouth member intermediate the inner walls attachable to the first section, and water conducting means extending from the handle through the upper and lower walls and the sections and back to the handle to cool the impressionable material.

9. A dental impression tray comprising a unitary section adapted to be placed between the upper and lower dental arch of the mouth, said section having walls on each side of each arch and flaring outwardly of each arch, said section having said upper and lower walls perforated for retaining a hydrocolloid gum therebetween, the upper and lower inner walls thereof being disposed on the side against the interior of the arch and the upper and lower outer walls thereof being on the outside of the arch, spaced retaining means on the section for a reticulated member placed intermediate the walls and between the retaining walls, a handle extending from the first named means, fastening means on the section adapted to retain the section together and water conducting means extending from the section to the upper and lower walls and back to the section.

10. A dental impression tray comprising a handle, a frame thereon adapted to be placed between the upper and lower dental arch of the mouth and conforming with said arches and forming upper and lower perforated retaining walls for each arch respectively, retaining means in the frame corresponding with the outside of the dental arches, said means having spaced perforated retaining upper and lower walls for a hydrocolloid gum disposed therein, one on the side against the interior of the arch and the other on the outside of the arch, transverse, spaced means on the frame for holding a reticulated member intermediate the upper and lower retaining walls connected to the frame, a mid-mouth section for the frame forming an upper vault and a lower lingual flange with a recess to hold said reticulated member, and adjustable fastening means on the handle adapted to retain the frame and mid mouth section together.

11. A tray according to claim 10 provided with a conduit on the edge of the upper and lower inner and outer retaining walls.

References Cited in the file of this patent

UNITED STATES PATENTS

| | | |
|---|---|---|
| 1,979,493 | Salvio | Nov. 6, 1934 |
| 2,036,735 | Welker | Apr. 7, 1936 |
| 2,583,170 | Getz | Jan. 22, 1952 |

FOREIGN PATENTS

| | | |
|---|---|---|
| 321,475 | Great Britain | Nov. 14, 1929 |